No. 607,099. Patented July 12, 1898.
W. M. WADLEIGH.
ATTACHMENT FOR HARVESTERS.
(Application filed Mar. 14, 1896.)
(No Model.)
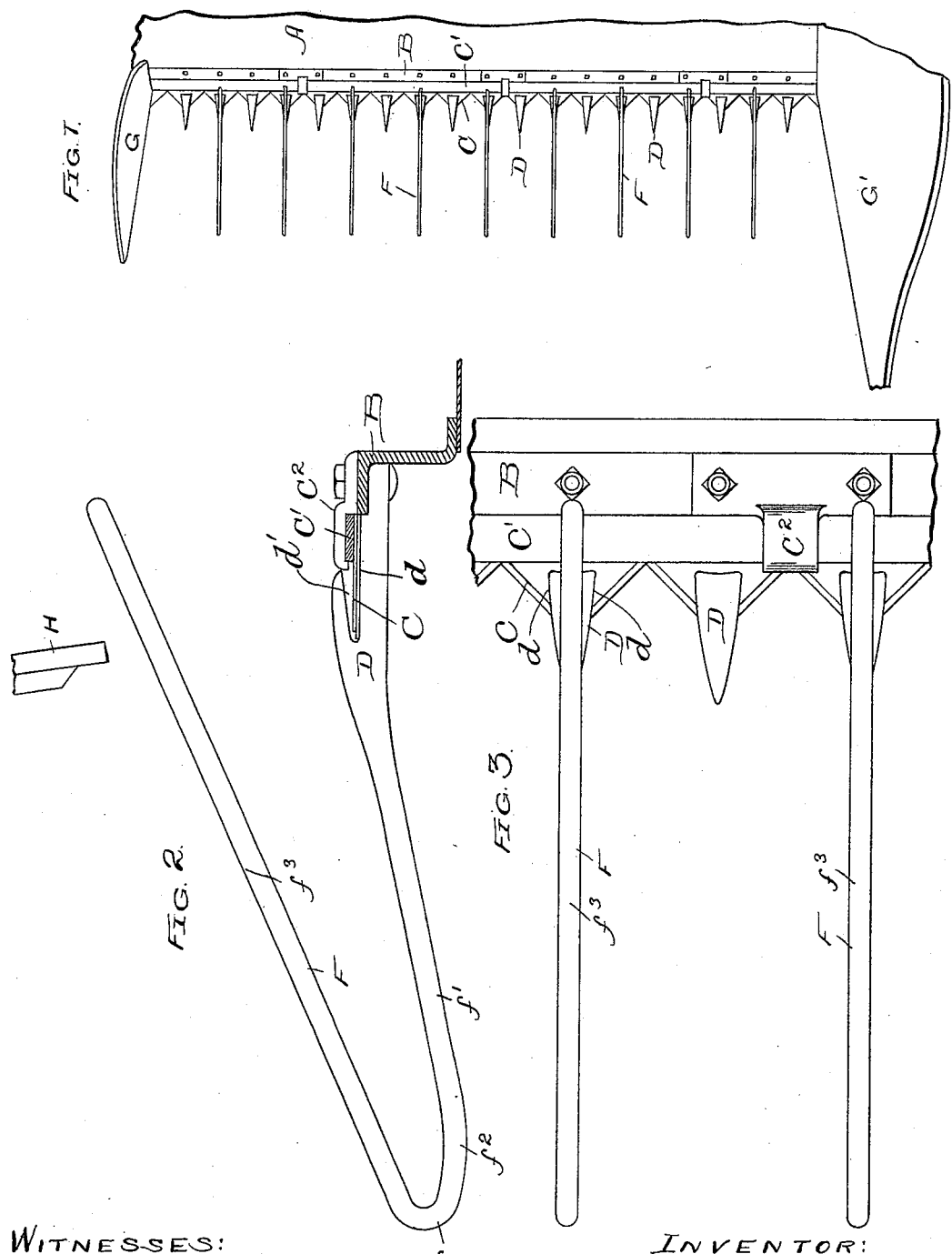
WITNESSES:
INVENTOR:
WILLIAM M. WADLEIGH
BY Munday, Evarts & Adcock
HIS ATTORNEYS.

UNITED STATES PATENT OFFICE.

WILLIAM M. WADLEIGH, OF MILKS GROVE, ILLINOIS.

ATTACHMENT FOR HARVESTERS.

SPECIFICATION forming part of Letters Patent No. 607,099, dated July 12, 1898.

Application filed March 14, 1896. Serial No. 583,235. (No model.)

*To all whom it may concern:*

Be it known that I, WILLIAM M. WADLEIGH, a citizen of the United States, residing at Milks Grove township, in the county of Iroquois and State of Illinois, have invented a new and useful Improvement in Attachments for Harvesters, of which the following is a specification.

My invention relates to improvements in harvesters and like machines.

Heretofore great difficulty has been experienced in practically cutting and saving with harvesters or other like machines grain, seed-grasses, or other crops when the same are badly down or flat upon the ground or lodged or crinkled.

The object of my invention is to provide an improved construction of harvester, reaper, or like machine by means of which grain, seed-grasses, or other crops, however badly or flatly upon the ground the same may be down, lodged, or crinkled, may be properly cut and saved.

A further object is to provide such a construction of my invention that it may be conveniently and quickly applied to the ordinary harvesters, reapers, or cutting-machines now in use.

A still further object is to provide means for effectually preventing cornstalks or rubbish from catching upon the finger-guards or clogging the cutting mechanism or interfering with the cutting and saving of the grain or crops.

With these objects in view my invention consists in providing the ordinary finger-guards, within which the sickle of the harvester reciprocates, with supplemental extensions or elevating-guards extending preferably about one foot, more or less, in advance of the points of the finger-guards and elevated at their rear ends preferably from three to six inches, more or less, above the rear ends of the finger-guards, the upper edge of the supplemental extension or elevating-guard being inclined or wedging, so as to raise or elevate the down, lodged, or crinkled grain or seed-grasses as they advance through and under the same above the sickle and finger-guards or cutting mechanism of the machine in order that the same may thus be cut and saved. The forward end, nose, or point of the supplemental extension or elevating-guard is preferably rounded to prevent cornstalks or rubbish catching upon it, and the elevating-guard is also preferably made somewhat runner or shoe shaped at its forward end, as to its lower edge, to prevent its digging too deeply into the ground. The lower edge or member of the elevating-guard also preferably projects somewhat downward, so that when required the point or nose of the guard may be made to ride upon or dig more or less into the ground without having to tilt the platform of the machine too much. Preferably each alternate finger-guard only is furnished with the supplemental extension or elevating-guard, though a greater or less number may be used, if desired, without departing from the principle of my invention. The supplemental extension or elevating-guard may be secured or attached directly or indirectly to the finger-guard itself or in operative position in relation thereto by any suitable means. I, however, prefer to mount it in operative position by forming it integral with the finger-guard itself or welding it thereto. The supplemental extension or elevating-guard may be made of any suitable construction or material. I, however, prefer to make it of a metal rod bent at its middle portion to form its nose or forward point, and the two members of the bent rod spreading apart at an angle, one to form the lower edge or member of the guard and the other to form its upper edge or member. The lower member of this bent rod is preferably welded or secured directly to the finger-guard near its end, and if the guard is made of soft or malleable metal the inclination of the upper member of the guard may be readily changed or adjusted sufficiently by bending it so that it will stand at a greater or less angle.

My invention also consists in the novel construction of parts and devices and novel combinations of parts and devices herein shown and described, and more particularly pointed out in the claim.

In the drawings, Figure 1 is a plan view of my invention, showing the parts of a harvester or other like machine with which my elevating-guard directly coöperates. Fig. 2 is a vertical cross-section showing the elevating-guard in elevation. Fig. 3 is an enlarged detail plan view.

In the drawings, A represents the platform of a harvester, reaper, or other machine; B, the finger-bar; C, the sickle; C', the sickle-bar; C², the sickle-holder; D, the finger-guards or guards within which the sickle or its knives reciprocate. All these parts may be of any well-known or suitable construction and need no special description.

The finger-guards D have the customary cutting edges $d\ d$ and slots $d'$, within which the knives or sections of the sickle reciprocate.

F F are the supplemental extensions or elevating-guards. The elevating-guards are preferably in number one for each alternate finger-guard. They may be secured or mounted in operative position in relation to the finger-guards in any suitable way or by any suitable means. A convenient way is to make the elevating-guard integral with the finger-guard or weld it directly to the finger-guard.

In this way the ordinary finger-guard may be readily removed from the finger-bar and another finger-guard having my elevating-guard attached to it secured in its place on the finger-bar when it is desired to use the machine for cutting lodged, crinkled, or down grain or other crops.

The elevating-guard F is provided with a rounded nose or point $f$ at its forward end. Its lower edge or member $f'$ should be inclined downward somewhat from the general direction of the finger-guard D and provided with a slight bend, curve, or runner or shoe shape $f^2$ near its nose to prevent its digging too deeply into the ground. Its upper edge or member $f^3$ should incline from the nose $f$ to its rear end and should terminate at or near the rear end of the finger-guard D.

The elevating-guard F may be made of any suitable material—as, for example, of sheet or plate steel—by simply cutting it of the required wedging or triangular shape; but instead of making it solid between its upper and lower inclined edges, as it naturally would be if cut or formed from a sheet or plate or board, I prefer to make it of a metal rod, solid or hollow, by simply bending the rod near its middle to form the point or nose $f$, as shown in the drawings. By this open construction between the upper and lower edges or members $f^3$ and $f'$ of the elevating-guard I am enabled to change or adjust the inclination of the upper edge or member $f^3$ as may be required, according to the length or condition of the grain or crops in the particular field being operated upon.

G is the inner and G' the outer divider, and H one of the wings of the reel, the same being of any ordinary or suitable construction.

If desired, one of my supplemental extensions or elevating-guards may be used on or in conjunction with each of the finger-guards between the dividers G G'; but I ordinarily find that one for each alternate finger-guard is sufficient to properly raise or elevate the grain or crop however badly it may be down, tangled, lodged, or crinkled.

By using the elevating-guard only on each alternate finger-guard it will be observed that the finger-guards and elevating-guards project forward or in advance of the cutting mechanism to different distances, and this arrangement of alternate long and short guards very greatly tends to prevent the collecting or lodgment of cornstalks or other rubbish. This result of preventing cornstalks or rubbish from clogging or interfering with the cutting mechanism is also in part accomplished by reason of the rounding point or nose $f$ of the elevating-guards. If the extension or elevating-guard is not made integral with or welded to the finger-guard, it may be supported in position in front of the finger-guard by attaching it to any suitable part—as, for example, directly to the finger-bar. The elevating-guard should be so mounted that its forward point or nose extends downward until about on a level with the bottom of the platform.

In operation the harvester or other machine to which my invention is applied is run into the down, lodged, or crinkled grain or crop, and as the elevating-guards move forward their forward points or noses will pass under the down, lodged, or crinkled grain or crop and raise or elevate it above the cutting mechanism of the machine into a more natural position by its moving along the upwardly-inclined edge or portion $f^3$ of the elevating-guard and be thus carried along in such raised position until delivered to the reel and cutting mechanism. Should it be found in operation that the point or nose of the elevating-guard does not extend low enough to go beneath all of the lodged or crinkled grain or crop, the nose or point may be depressed or extended farther downward and caused even to slightly enter or dig into the ground by simply tilting the platform and guard-bar of the machine in the ordinary manner. The elevating-guards may thus be made to raise the lodged or crinkled grain or seed-grasses no matter how flat or close down to the ground they may be. In operation a harvester or other machine provided with my invention may be run or driven in any direction excepting that toward which the down grain leans—that is to say, the machine may cut upon three sides of the field or land.

It will be observed that the point or nose $f$ of the elevating-guard is rounded, as contradistinguished from the sharp point with which the ordinary finger-guards have heretofore been provided. This is for the purpose of preventing the point of the elevating-guard from piercing cornstalks or rubbish and thus causing the cornstalks or rubbish to catch or lodge upon the elevating-guards and clogging the machine. As will be observed, however, from the plan view, the point of the elevating-guard is comparatively sharp, narrow, or thin in a horizontal direction, the point being only rounded in a vertical plane, as will appear from comparing the plan and side views. This narrowness or thinness in the horizontal direction enables the elevating-guards to penetrate the grain or crop with facility, while its round or nose shape in the vertical plane at the same time prevents, in a very large degree, rubbish from lodging thereon. This feature of the vertically-rounded point or nose for the guard is of value and may be used upon ordinary finger-guards as well as upon my elevating-guard.

I claim—

In a harvester or like machine, the combination with a finger-guard, of an elevating guard or device projecting in advance of the finger-guard and comprising a lower member extending forwardly and downwardly from the finger-guard, and an upper member extending upward and backwardly, and a nose or rounded point between said upper and lower members, the nose or front end of said elevating-guard being rounded and blunt in respect to a vertical plane only, and sharp and narrow in respect to a horizontal plane to enable the same to readily penetrate the grain, and at the same time prevent lodgment of stalks or rubbish thereon, and also to ride upon the ground and pass under the grain lying thereon without digging deeply into the ground, substantially as specified.

WILLIAM M. WADLEIGH.

Witnesses:
H. M. MUNDAY,
EDMUND ADCOCK.